(12) United States Patent
Yan et al.

(10) Patent No.: US 8,666,262 B2
(45) Date of Patent: Mar. 4, 2014

(54) METHOD FOR ADAPTIVE BLIND EQUALIZATION OF PSK SIGNAL, EQUALIZER AND RECEIVER

(75) Inventors: Meng Yan, Beijing (CN); Huijian Zhang, Beijing (CN); Zhenning Tao, Beijing (CN); Shoichiro Oda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 478 days.

(21) Appl. No.: 12/906,560

(22) Filed: Oct. 18, 2010

(65) Prior Publication Data

US 2011/0243575 A1    Oct. 6, 2011

(30) Foreign Application Priority Data

Mar. 30, 2010    (CN) .......................... 2010 1 0136984

(51) Int. Cl.
*H04B 10/60* (2013.01)
(52) U.S. Cl.
USPC .......................................... 398/209; 375/232
(58) Field of Classification Search
USPC .................................. 398/208–209; 375/232
See application file for complete search history.

(56) References Cited

U.S. PATENT DOCUMENTS

| 6,697,424 | B1 * | 2/2004 | Yang et al. .................... 375/233 |
| 2009/0079656 | A1 * | 3/2009 | Peyla et al. ..................... 343/860 |
| 2009/0285335 | A1 * | 11/2009 | Hoshuyama .................... 375/324 |
| 2010/0003028 | A1 * | 1/2010 | Zhang et al. ..................... 398/65 |

FOREIGN PATENT DOCUMENTS

| CN | 101022433 | | 8/2007 |
| CN | 101442364 | A | 5/2009 |
| CN | 101599801 | | 12/2009 |

OTHER PUBLICATIONS

Blind equalization using the constant modulus criterion: A Review by C, Richard Johnson, et al, in Proceedings of the IEEE, vol. 86, No. 10, Oct. 1998, pp. 1927-1950.
On the existence of undesirable global minima of Godard equalizers by C. B. Papadias in Acoustics, Speech and Signal Processing, vol. 5, 1997, pp. 3941-3944.
Numerical Optimization by Jorge Nocedal Stephen J.Wright, pp. 1-632 , 1999.
Chapter 18, "Special Cases of the Bussang Algorithm", Simon Haykin, Adaptive Filter Theory (Third Edition), Aug. 1998, pp. 792-795.
The Core of the FSE-CMA Behavoir Theory, "The CM Criterion and CMA", Simon Haykin, Unsupervised Daptive Filtering, Vo.. 11: blind deconvolution, John Wiley & Sons, Inc., 2000, pp. 42-45.
Chinese Office Action for corresponding Chinese Application No. 201010136984.8; Issued May 6, 2013.
Chinese Office Action mailed Nov. 26, 2013 in corresponding Chinese Application No. 201010136984.8.

* cited by examiner

*Primary Examiner* — Leslie Pascal
(74) *Attorney, Agent, or Firm* — Staas & Halsey LLP

(57) ABSTRACT

The present application discloses a method for adaptive blind equalization of a PSK signal, an equalizer and a receiver. According to embodiments as provided, a conjugate product of a current output and a precedent output of an FIR filter is calculated, an equalization coefficient is updated using the conjugate product, and then an input signal is filtered using the FIR filter with the updated equalization coefficient. The embodiments as provided is applicable to adaptive blind equalization of any phase shift keying signal including a BPSK signal.

4 Claims, 4 Drawing Sheets

METHOD FOR ADAPTIVE BLIND EQUALIZATION OF PSK SIGNAL, EQUALIZER AND RECEIVER

CROSS REFERENCE TO RELATED APPLICATIONS

This application claims the benefit of Chinese Application No. 201010136984.8, filed Mar. 30, 2010, the disclosure of which is incorporated herein by reference.

FIELD OF THE INVENTION

The present application generally relates to optical communication and in particular to adaptive blind equalization of a PSK (Phase Shift Keying) signal.

BACKGROUND OF THE INVENTION

Future high-speed and large-capacity optical communication will advance toward coherent optical communication. Various modulation formats, for example, amplitude modulation, phase modulation, orthogonal amplitude modulation (QAM), etc., can be used in a coherent optical communication system. Phase shift keying (PSK) is a format of pure phase modulation in which information to be transported is represented with the phase of a symbol. PSK with a number m of possible symbols for transmission is referred to as mPSK (m is an integer larger than or equal to 2) in which a symbol S can be represented as $S=\exp(j\cdot 2k\pi/m)$, where $k=0, 1, \ldots m-1$, and the symbol S takes a value varying with k. General modulation formats of BPSK (binary phase shift keying), QPSK (orthogonal phase shift keying or quarter phase shift keying), etc., each are specific examples of mPSK with m taking values of 2 and 4 respectively.

Since inter-symbol interference (ISI) may be introduced into an optical channel, ISI would be removed in a coherent optical receiver typically using adaptive equalization technique based upon a finite impulse response (FIR) filter. Also blind equalization is desirably used to improve the utilization ratio of the spectrum and avoid an extra overhead due to training sequences. The constant modulus algorithm (CMA) is one of the most common adaptive blind equalization algorithms, e.g., *Blind equalization using the constant modulus criterion: A Review* by C, Richard Johnson, et al, in Proceedings of the IEEE, vol. 86, no. 10, October 1998, may be cited, the disclosure of which is incorporated here by reference in its entirety.

The CMA is applicable to the predominant modulation format QPSK adopted in the current coherent communication system. Unfortunately, one of perquisites for normal operation of the CMA is a circularly symmetric constellation diagram of a signal, i.e., $E\{S^2\}=0$ (that is, the expectation of $S^2$ is 0), where S denotes a symbol (for example, $S=\exp(jk2\pi/m)$ for an mPSK signal). See *Adaptive Filter Theory, $3^{rd}$ edition* by Simon Haykin (Prentice Hall, 1998), for example, the disclosure of which is incorporated here by reference in its entirety. Except for a BPSK signal, all the mPSK signals with m>2 satisfy this condition. This means inapplicability of the CMA to the BPSK signal. See *On the existence of undesirable global minimum of Godard equalizers* by C. B. Papadias in Acoustics, Speech and Signal Processing, vol. 5, 1997, the disclosure of which is incorporated here by reference in its entirety.

SUMMARY OF THE INVENTION

The following is a summary of the invention to facilitate basic understanding of some aspects thereof. It shall be appreciated that this summary is not an exhaustive overview of the invention and is intended neither to identify crucial or important parts of the invention nor to delineate the scope of the invention. Rather, the primary purpose of the summary is to merely present some concepts of the invention in a simplified form prior to the more detailed description that is presented hereinafter.

An object of the invention is to provide a method for adaptive blind equalization with a wider scope of applicability, which is applicable to all the mPSK signals (m≥2), i.e., including a BPSK signal.

Also another object of the invention is to provide a new method for adaptive blind equalization for a PSK signal.

Also a further object of the invention is to provide a method for adaptive blind equalization applicable to a BPSK signal.

An additional object of the invention is to provide an equalizer and a coherent optical receiver corresponding to the method.

According to an embodiment of the invention, there is provided a method for adaptive blind equalization of a PSK signal, which includes: calculating the conjugate product of a current output and a precedent output of an FIR filter; updating an equalization coefficient using the conjugate product; and filtering an input signal using the FIR filter with the updated equalization coefficient.

According to another embodiment of the invention, there is provided an equalizer for a PSK signal, which includes: a conjugate product calculator to calculate the conjugate product of a current output and a precedent output of the equalizer; an equalization coefficient updator to update the equalization coefficient using the conjugate product; and a finite impact response filter to filter an input signal using the updated equalization coefficient.

According to another embodiment of the invention, there is provided a coherent optical receiver including at least one equalizer as specified above.

According to the above embodiments, adaptive blind equalization of a PSK signal including a BPSK signal can be achieved.

BRIEF DESCRIPTION OF THE DRAWINGS

The above and other objects, features and advantages of the invention will become more apparent with reference to the following description of the embodiments of the invention taken in connection with the drawings throughout which identical or corresponding technical features and components will be denoted with identical or corresponding reference numerals. The drawings together with the following detailed description are included in and form a part of the present specification and serve to further illustrate preferred embodiments of the invention and explain the principal and advantages of the invention. In the drawings.

DETAILED DESCRIPTION OF THE INVENTION

Figure 1:
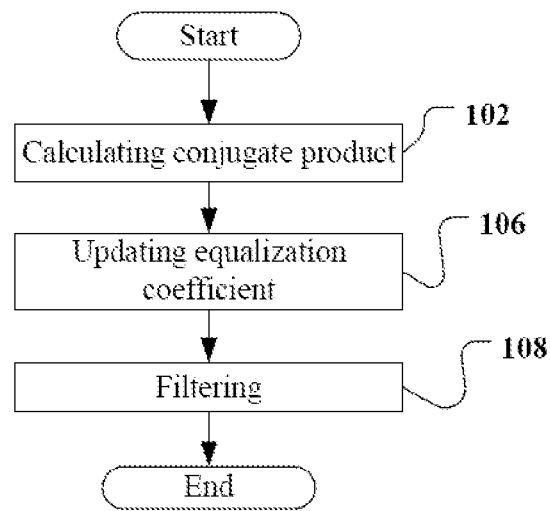
FIG. 1 is a flow chart of a method for adaptive blind equalization of a PSK signal according to an embodiment of the invention.

Demonstrative embodiments of the invention will be described hereinafter in connection with the drawings. For clarity and conciseness, not all the features of the embodiments in practice will be described in the specification. However it shall be appreciated that numerous decisions specific to any of the embodiments in practice shall be made during development of the embodiments in practice in order to attain a specific object of the developer, for example, to comply with those constraint conditions relevant to a system or a service, which constraint conditions may vary with the embodiment. It shall further be appreciated that although a development task may be very complex and time-consuming, such a development task may be merely a routing task for those skilled in the art benefiting from this disclosure.

It shall further be noted here that only those device structures and/or process steps closely relevant to a solution of the invention have been illustrated in the drawings from which other details of less relevance to the invention have been omitted so as not to obscure the invention due to the unnecessary details.

The First Embodiment

It is assumed that an adaptive equalizer of a receiver to which a sampled signal is directed be structured as an L-tap FIR filter, where L is an integer larger than or equal to 1 and denotes the number of sampling points to be considered for equalization of the equalizer. Let $X_t$ denote an input signal to the equalizer at a point of time $tT_s$ (t is an integer) and $W_t$ denote tap coefficients of the FIR filter at the point of time $tT_s$, so both $X_t$ and $W_t$ are L-dimension vectors. An output of the equalizer at the point of time $tT_s$ is $y_t = W_t^T X_t$ ($T$ denotes transposition). For example, when L is 3, it means that three samples received consecutively, i.e., $X_t = [x_{ts-2}, x_{ts-1}, x_{ts}]$, where $X_t$ is a current input signal to the equalizer, and $x_{ts}$ to $x_{ts-2}$ are three consecutive samples (s is a positive integer denoting the number of samples per symbol), will be considered for equalization of the signal. Although s=2 is typical in a coherent optical communication system, those skilled in the art can appreciate that the calculation will be similar for a scenario with s≠2 upon reading the disclosure of the present application.

An adaptive equalization process can be regarded as a process of optimizing a cost function, for example, the CMA is actually equivalent to optimization of the following cost function:

$$c_{cma} = E\{(|y_t|^2 - \gamma)^2\},$$

Where $E\{\cdot\}$ denotes expectation, and $\gamma$ denotes a constant larger than 0. This equation means that $(|y_t|^2 - \gamma)^2$ is expected to be close to 0, that is, the modulus of $y_t$ is expected to be close to a specific constant ($\sqrt{\gamma}$), where $\gamma$ takes a value of 1 in the event that the modulus of the signal is normalized.

The CMA as described by the above formula is applicable to any mPSK signal with m>2 but not applicable to a BPSK signal. The applicant has identified from a study that the equalizer can be made applicable to a BPSK signal if outputs from the FIR filter at a current point of time and at another different point of time can be considered concurrently.

The different point of time may o be a point of time adjacent to or not adjacent to the current point of time. For equalization of the output $y_t$ at the current point of time $tT_s$ for example, either an output $y_{t-1}$ at a precedent point of time $(t-1)T_s$ or an output $y_{t-2}$ at a further precedent point of time $(t-2)T_s$ can be considered. Descriptions below will be presented in an example of concurrently considering the output $y_t$ and the output $y_{t-1}$.

If a signal for transmission is an mPSK signal, then the output $y_t$ from the equalizer from which ISI has been removed completely is an mPSK signal with phase noise, i.e. (in the specification of this application, it is assumed that the modulus of the signal be normalized for the sake of conciseness, so no coefficient will be affixed to any expression of a signal in all the equations):

$$y_t = \exp\left[j\left(\frac{2k_t\pi}{m} + \phi_t\right)\right], k_1 = 0, 1, \ldots m-1.$$

Where $\phi_t$ denotes the phase noise.

Correspondingly, the output at the point of time $(t-1)T_s$ is:

$$y_{t-1} = \exp\left[j\left(\frac{2k_{t-1}\pi}{m} + \phi_{t-1}\right)\right], k_2 = 0, 1, \ldots m-1.$$

The conjugate product of the outputs from the equalizer at the points of time $tT_s$ and $(t-1)T_s$, are calculated as $r_t = y_t y_{t-1}^*$ (* denotes conjugation) so that:

$$r_t = \exp\left[j\left(\frac{2k_t\pi}{m} + \phi_t\right) - j\left(\frac{2k_{t-1}\pi}{m} + \phi_{t-1}\right)\right]$$

and further that:

$$r_t = \exp\left[j\left(\frac{2k\pi}{m} + \Delta\phi_t\right)\right],$$

$$\Delta\phi_t = \phi_t - \phi_{t-1} \quad k = k_t - k_{t-1} = 0, 1, \ldots m-1.$$

where $\Delta\phi_t$ denotes a random variable with a mean value of 0 and a variance proportional to the product of a laser line width and a symbol period $T_s$. Since the symbol rate of an optical communication system is typically in the order of GHz, that is, $T_s$ is in the order of $10^{-9}$, and the laser line width thereof is generally below 1 MHz, the item of phase noise $\Delta\phi_t$ in the above equation can be neglected, so:

$$r_t \approx \exp\left[j\left(\frac{2k\pi}{m}\right)\right], k = 0, 1, \ldots m-1. \quad (1)$$

It can be seen that $r_t$ is still an mPSK signal. For applicability to a BPSK signal, in the present embodiment the following cost function is constructed:

$$c = E\{|r_t^m - 1|^2\} \quad (2)$$

As mentioned above, the above equation is an expression in the event that the modulus is normalized. Without normalization of the modulus, the above equation is:

$$c = E\{|r_t^m - \gamma|^2\} \quad (3)$$

where $r_t$ is the conjugate product of the outputs $y_t$ and $y_{t-1}$, $\gamma$ denotes a constant, and m denotes the number of constellation points of the mPSK signal. The square in the above equation is merely for the convenience of calculation, and in fact a modulus operation is enough.

Therefore, the present embodiment proposes a method for adaptive blind equalization of a PSK signal based upon the above cost function. That is, as illustrated in FIG. 1, firstly the conjugate product r of a current output and a precedent output (which may be immediately adjacent or not adjacent to each other as mentioned above) of an infinite impulse response filter (FIR filter, that is an equalizer) is calculated (step 102), then the equalization coefficient, i.e., the tap coefficients of the FIR filter, is updated using the conjugate product (step 106), and next an input signal is filtered using the FIR filter with the updated coefficient (step 108).

Figure 3:
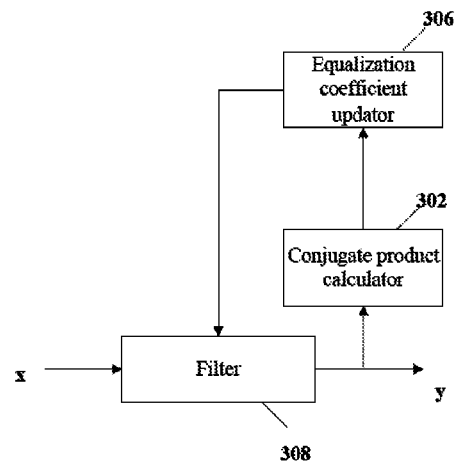
FIG. 3 is a schematic block diagram of a PSK signal equalizer according to an embodiment of the invention.

Correspondingly, as illustrated in FIG. 3, this embodiment further provides an equalizer for a PSK signal, which includes: a conjugate product calculator 302 to calculate the conjugate product of a current output and a precedent output of the equalizer; an equalization coefficient updator 306 for updating an equalization coefficient using the conjugate product; and an FIR filter 308 to filter an input signal using the updated equalization coefficient.

Specifically, as illustrated in FIG. 3, the equalizer receives a signal x, and the L-tap FIR filter 308 taking a number L of consecutive samples as an input ($X_t$) derives an output signal $y_t$ from the equalization coefficient $W_t$. The conjugate product calculator 302 calculates the conjugate product $r_t$ from the output $y_t$ and a precedent output (e.g., $y_{t-1}$ but not limited thereto), and the equalization coefficient updator 306 updates the equalization coefficient $W_t$ to $W_{t+1}$ using the conjugate product $r_t$ so as to filter a next output $X_{t+1}$.

Depending on the situation, the equalization coefficient can be updated for each input signal, but it can alternatively be updated just when necessary, or every specific number of input signals, etc.

The equalization coefficient is updated by optimizing the cost function, i.e., by minimizing $E\{|r^m-\gamma|^2\}$, that is, by deriving the FIR coefficient $W_t$ which minimizes $E\{|r^m-\gamma|^2\}$, for example, by using the Newton method, the Levenberg-Marquardt method, etc. See *Numerical Optimization* by Nocedal, Jorge & Wright, Stephen J., (1999), Springer-Verlag. ISBN 0-387-98793-2, for example, the disclosure of which is incorporated here by reference in its entirety. Therefore, the step 106 of updating the equalization coefficient using the conjugate product and the equalization coefficient updator 306 can be implemented based on any of the above methods.

Figure 2:
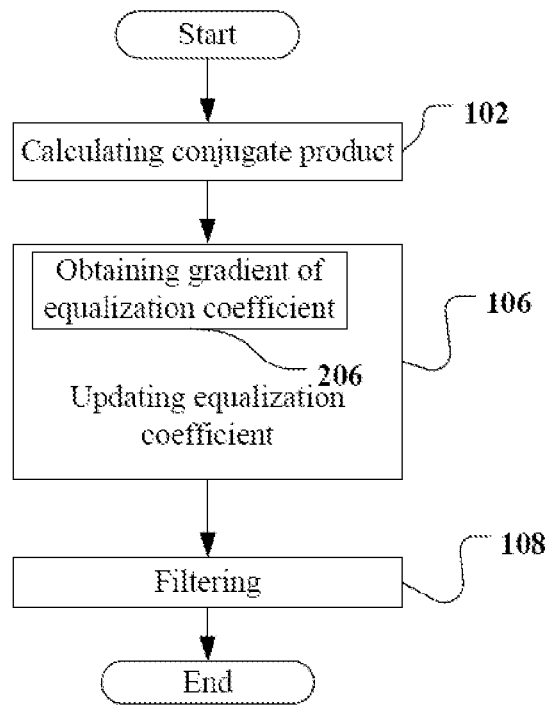
FIG. 2 is a flow chart of a method for adaptive blind equalization of a PSK signal according to another embodiment of the invention.
Figure 4:
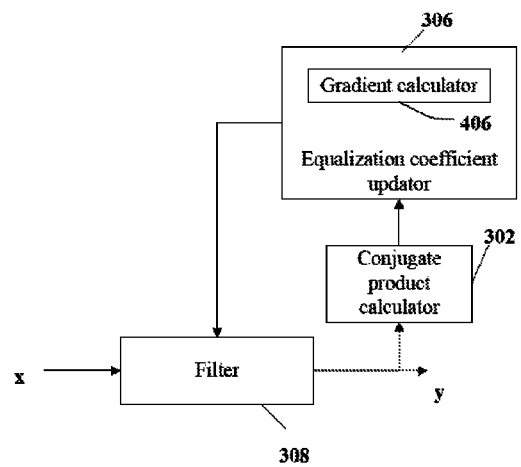
FIG. 4 is a schematic block diagram of a PSK signal equalizer according to another embodiment of the invention.

Another common optimization method is the gradient descending method (the step 206 in FIG. 2. In such a case, the equalization coefficient updator 306 of the equalizer in FIG. 4 further includes a gradient calculator 406), and descriptions below will be presented by taking the gradient descending method as an example. A gradient of the coefficient is defined as:

$$\nabla W_t = \frac{\partial (|r_t^m - \gamma|^2)}{\partial W_t} = me_t(r_t^*)^{m-1} y_{t-1} X_t^* + me_t^* r_t^{m-1} y_t X_{t-1}^* \quad (4)$$

where $e_t = r_t^m - \gamma$.

A corresponding equation for updating the coefficient is:

$$W_{t+1} = W_t - \mu \cdot \nabla W_t \quad (5)$$

where $\mu$ denotes a step at which the coefficient is updated and is a real number above zero which can be empirically preset and adjusted.

The Second Embodiment

In a real coherent optical communication system, there is a specific frequency difference $\Delta\omega$ between an emitting laser and a local oscillation laser with respective specific line widths $\Delta f$. If transmission signal is an mPSK signal, the output $y_t$ from the equalizer from which the ISI has been removed completely is an mPSK signal with a frequency difference and phase noise, i.e.:

$$y_t = \exp\left[j\left(\frac{2k_t\pi}{m} + \phi_t + \Delta\omega tT_s\right)\right], k_t = 0, 1, \ldots m-1.$$

Where $\phi_t$ denotes the phase noise, $\Delta\omega tT_s$ denotes an additive phase due to the frequency difference between the emitting laser and the local oscillation laser, and $T_s$ denotes a symbol period.

Correspondingly, an output at a point of time t−1 is:

$$y_{t-1} = \exp\left[j\left(\frac{2k_{t-1}\pi}{m} + \phi_{t-1} + \Delta\omega(t-1)T_s\right)\right], k_{t-1} = 0, 1, \ldots m-1.$$

The conjugate product of the outputs from the equalizer at the points of time $tT_s$ and $(t-1)T_s$ is calculated as $r_t = y_t y_{t-1}^*$ (* denotes conjugation) so that:

$$r_t = \exp\left[j\left(\frac{2k_t\pi}{m} + \phi_t + \Delta\omega tT_s\right) - j\left(\frac{2k_{t-1}\pi}{m} + \phi_{t-1} + \Delta\omega(t-1)T_s\right)\right]$$

and further that:

$$r_t = \exp\left[j\left(\frac{2k\pi}{m} + \Delta\phi_t + \Delta\omega T_s\right)\right],$$
$$k = k_t - k_{t-1} = 0, 1, \ldots m-1, \Delta\phi_t = \phi_t - \phi_{t-1}.$$

Since the symbol rate of an optical communication system is typically in the order of several to tens of GHz, that is, $T_s$ is in the order of $10^{-9}$, while the laser line width $\Delta f$ thereof is generally below 1 MHz, the item of phase noise $\Delta\phi_t$ in the above equation can be neglected, and since the frequency difference between the emitting laser and local oscillation laser may be up to several GHz, the item of the frequency difference in the above equation can not be neglected, so:

$$r_t \approx \exp\left[j\left(\frac{2k\pi}{m} + \Delta\theta\right)\right], k = 0, 1, \ldots m-1. \quad (1')$$

where $\Delta\theta = \Delta\omega \cdot T_s$ denotes the phase difference between adjacent symbols due to the frequency difference between the emitting laser and local oscillation laser. It can be seen that $r_t$ depends upon the frequency difference instead of phase noise and is an mPSK signal with a phase offset $\Delta\theta$. Therefore, a method proposed in this embodiment adopts the following cost function to remove the frequency difference:

$$c = E\{|r^m - e^{jm\Delta\theta}|^2\} \quad (2')$$

where $r_t$ is the conjugate product of the outputs $y_t$ and $y_{t-1}$, and $m$ denotes the number of constellation points of the mPSK signal. Again, the square in the above equation is merely for the convenience of calculation, and in fact a modulus operation is enough.

Figure 5:
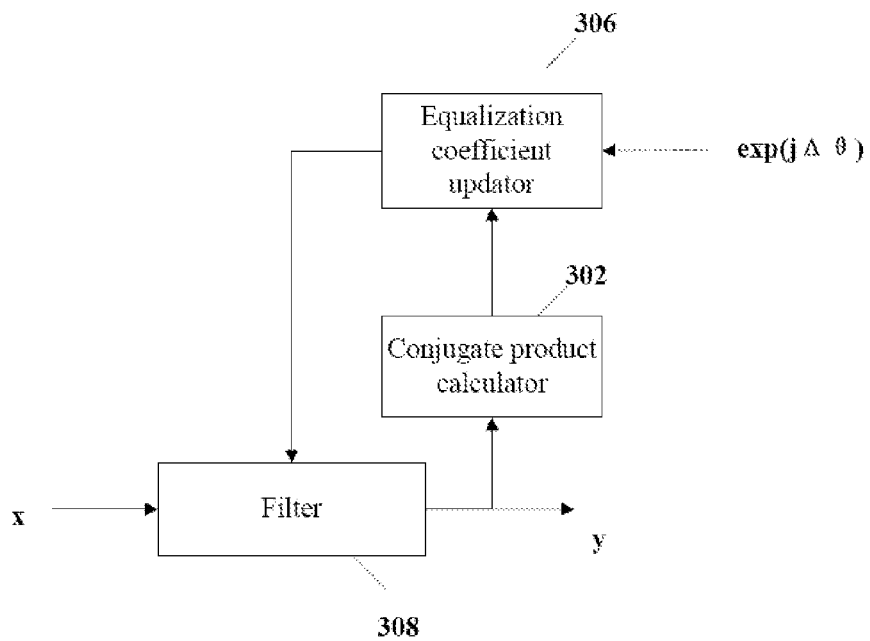
FIG. 5 is a schematic block diagram of a PSK signal equalizer according to a further embodiment of the invention.
Figure 6:
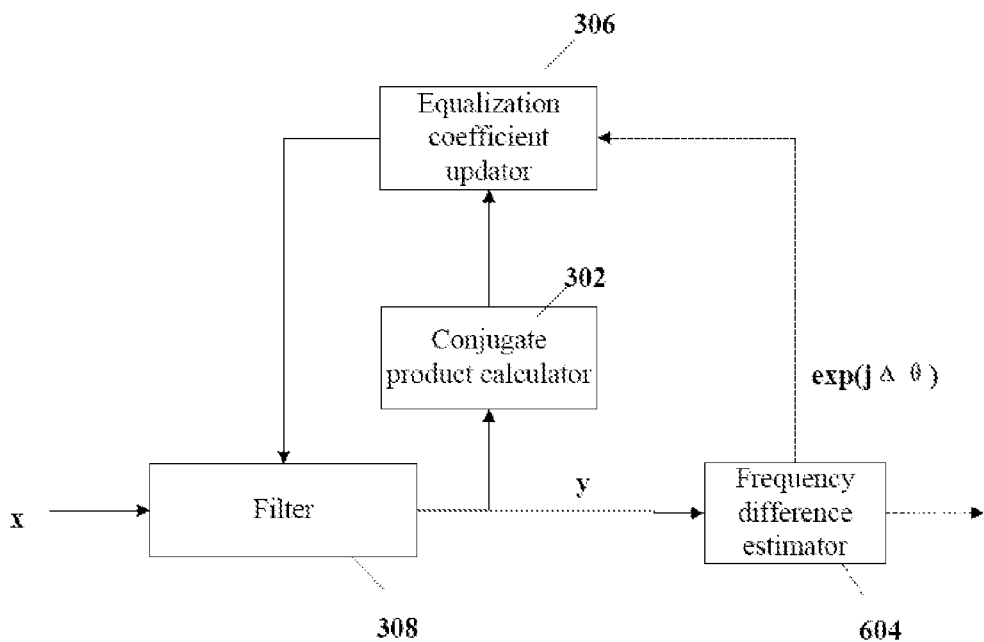
FIG. 6 is a schematic block diagram of a receiver according to an embodiment of the invention.

That is, on the basis of the first embodiment, this embodiment further takes into consideration, in the step 106 of updating the equalization coefficient and the equalization coefficient updator 306, the phase difference between the current output and the precedent output due to the frequency difference between the emitting laser and the local oscillation laser, as illustrated with the item "exp(jΔθ)" in FIG. 5. The phase difference can be derived in different ways, for example, derived empirically from the performance of the emitting laser and the local oscillation laser, estimated by a frequency difference estimator 604 in a receiver (FIG. 6), etc. The frequency difference can be estimated in various methods, for example, using a method for estimating a frequency difference as disclosed in Chinese Patent Application No. 200710166788.3, filed by FUJITSU CO., LTD., on Nov. 19, 2007 and entitled "Optical coherent receiver and device and method for estimating frequency difference of optical coherent receiver", the disclosure of which is incorporated here by reference in its entirety.

Similar to the first embodiment, $|r^m - e^{jm\Delta\theta}|^2$ can be optimized in various methods, for example, using the Newton method, the Levenberg-Marquardt method, etc. Descriptions will be presented below of also the gradient descending method as an example (corresponding to the gradient descending method, the equalization coefficient updator in FIG. 5 and FIG. 6 may include a gradient calculator which is not illustrated). A gradient of the coefficient is defined as (the subscript t has been omitted in the above equation (2') for the sake of conciseness but will still be affixed in the following calculation):

$$\nabla W_t = \frac{\partial (|r_t^m - e^{jm\Delta\theta}|^2)}{\partial W_t} = me_t(r_t^*)^{m-1} y_{t-1} X_t^* + me_t^* r_t^{m-1} y_t X_{t-1}^* \quad (4')$$

where $e_t = r_t^m - e^{jm\Delta\theta}$.

A corresponding equation of updating the coefficient is also the equation (5).

As can be observed from the above respective equations, when $\exp(j\Delta\theta) \approx 1$ in the event of a relatively small frequency difference which can be neglected, the present embodiment will be reduced to the first embodiment (in the event of normalization).

From another viewpoint, since the frequency difference is fixed for a specific system, the item of the phase difference due to the frequency difference in the present embodiment can alternatively be regarded as the constant γ in the first embodiment.

The Third Embodiment

It has been proposed in the first and second embodiments that the equalization coefficient is updated using the conjugate product of the current output and the precedent output of the equalizer, and the examples of different cost functions applicable to any PSK signal including a BPSK signal have been presented based upon this idea.

We also know that a BPSK signal is a special PSK signal, and for the equalizer from which the ISI has been removed, the following equation can be derived from the equation (1):

$$r_t \approx \exp\left[j\left(\frac{2k\pi}{m}\right)\right] = \exp[j(2k\pi/2)] = \exp(jk\pi), k = 0, 1.$$

That is, $r_t \approx \pm 1$.

That is, equalized $r_t$ shall be a real number in an ideal scenario without any frequency difference and corresponding to the first embodiment. In other words, its real part shall approximate the modulus of the signal and its imaginary part shall approximate zero. Therefore, the following cost function can further be constructed specifically for a BPSK signal for use in the step 106 of updating the equalization coefficient and the equalization coefficient updator 306 (in the event of normalization):

$$c = E\{||Re(r_t)| - 1| + |Im(r_t)|\}$$

where $E\{\bullet\}$ denotes expectation, $r_t$ denotes the conjugate product, and $Re(\bullet)$ and $Im(\bullet)$ denote operations for calculating real and imaginary parts respectively.

As mentioned above, the above equation is an expression in the event that the modulus is normalized. Without normalization of the modulus, the above equation is:

$$c = E\{||Re(r)| - \gamma| + |Im(r)|\} \quad (6)$$

where γ denotes a real constant greater than 0, and r denotes the conjugate product of the outputs $y_t$ and $y_{t-1}$.

Again similar to the first and second embodiments, the coefficient can be updated in the step 106 of updating the equalization coefficient and in the equalization coefficient updator 306 in various methods. Descriptions will be presented below of also the gradient method as an example (in such a situation the equalization coefficient updator 306 includes a gradient calculator 406). A gradient of the equalization coefficient is derived by calculating a gradient of the cost function in equation (6) (the subscript t has been omitted in the above equation (6) for the sake of conciseness but will still be affixed in the following calculation):

$$\nabla W_t = \text{sgn}(|Re(r_t)| - \gamma) \cdot \text{sgn}(Re(r_t)) \cdot \frac{\partial Re(r_t)}{\partial W_t} + \text{sgn}(Im(r)) \cdot \frac{\partial Im(r_t)}{\partial W_t} \quad (7)$$

where, $$\frac{\partial Re(r_t)}{\partial W_t} y_t X_{t-1}^* + y_{t-1} X_t^* \quad \frac{\partial Im(r_t)}{\partial W_t} = -j(y_t X_{t-1}^* - y_{t-1} X_t^*)$$

$$\text{sgn}(x) = \begin{cases} 1 & \text{for } x > 0 \\ 0 & \text{for } x = 0 \\ -1 & \text{for } x < 0 \end{cases}$$

The corresponding equation of updating the coefficient is also the equation (5).

The Fourth Embodiment

Similar to the consideration in the second embodiment, in a real coherent optical communication system, there is a specific frequency difference γω between an emitting laser and a local oscillation laser with respective specific line widths γf. Therefore for a BPSK signal, the following equation is derived from (1') when the ISI has been removed completely from the equalizer:

$$r_t \approx \exp\left[j\left(\frac{2k\pi}{m} + \Delta\theta\right)\right] = \exp[j(2k\pi/2 + \Delta\theta)] = \exp(jk\pi + j\Delta\theta), k = 0, 1.$$

That is, $r_t \approx \pm\exp(j\Delta\theta)$.

where $\Delta\theta = \Delta\theta \cdot T_s$ denotes the phase difference between adjacent symbols due to the frequency difference between the emitting laser and the local oscillation laser. It can be seen that $r_t$ depends upon the frequency difference. Therefore, in view of removing the frequency difference, $r_t$ can be multiplied by $\exp(-j\Delta\theta)$, that is, a cost function similar to that in the third embodiment can be constructed under a principal similar thereto. That is, this embodiment can adopt the following cost function:

$$c = E\{||Re(re^{-j\Delta\theta})| - \gamma| + |Im(re^{-j\Delta\theta})|\} \quad (6')$$

Where γ denotes a real constant greater than 0, r denotes the conjugate product of outputs $Y_t$ and $Y_{t-1}$, $E\{\cdot\}$ denotes expectation, and $Re(\cdot)$ and $Im(\cdot)$ denote operations for calculating real and imaginary parts respectively.

Again similar to the above respective embodiment, the coefficients can be updated in the step 106 of updating the equalization coefficient and the equalization coefficient updator 306 in various methods. Descriptions will be presented below of also the gradient method as an example (in such a situation the equalization coefficient updator 306 includes a gradient calculator 406). A gradient of the equalization coefficient is derived by calculating a gradient of the cost function in (6') (the subscript t has been omitted in the above equation (6') for the sake of conciseness but will still be affixed in the following calculation):

$$\nabla W_t = \text{sgn}(|Re(r_t e^{-j\Delta\theta})| - \gamma) \cdot \text{sgn}(Re(r_t e^{-j\Delta\theta})) \cdot \frac{\partial Re(r_t e^{-j\Delta\theta})}{\partial W_t} + \quad (7')$$

$$\text{sgn}(Im(r_t)) \cdot \frac{\partial Im(r_t e^{-j\Delta\theta})}{\partial W_t}$$

where $$\frac{\partial Re(r_t e^{-j\Delta\theta})}{\partial W_t} = e^{-j\Delta\theta}(y_t X_{t-1}^* + y_{t-1} X_t^*)$$

$$\frac{\partial Im(r_t e^{-j\Delta\theta})}{\partial W_t} = -je^{-j\Delta\theta}(y_t X_{t-1}^* - y_{t-1} X_t^*)$$

$$\text{sgn}(x) = \begin{cases} 1 & \text{For } x > 0 \\ 0 & \text{For } x = 0 \\ -1 & \text{For } x < 0 \end{cases}$$

The corresponding equation of updating the coefficient is also the equation (5).

The Fifth Embodiment

For further improving capacity, polarization multiplexing is typically used (that is, information is transported at both orthogonal polarized status) at a transmitter in a coherent optical communication system, and a coherent optical receiver with polarization diversity is used at a receiver. In such a case, an equalizer will be used for each of the polarization directions. And a symbol in one of the polarization directions may be subject to both interference from the other symbols in the same polarization direction and that from symbols in the other polarization direction. Therefore for an equalized output in either of the polarization directions (i.e., an output of an impulse response filter), inputs in both of the polarization directions will be filtered. In view of this, on the basis of the above respective embodiments, the impulse response filter 308 of the equalizer in each of the polarization directions can be configured as being constituted of a first filter and a second filter in the present embodiment. Apparently, the horizontal and vertical polarization directions are relatively defined and are interchangeable, so an equalizer and an equalization method in the horizontal polarization direction will be described as an example in this embodiment.

Figure 7:
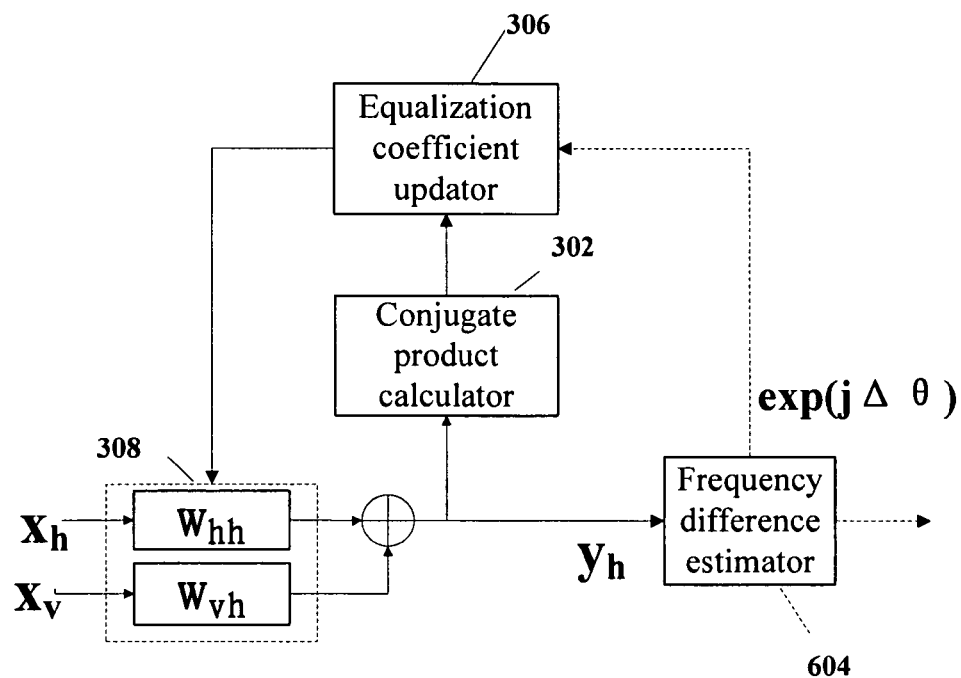
FIG. 7 is a schematic block diagram of a receiver according to another embodiment of the invention.

As illustrated in FIG. 7, in the method for adaptive blind equalization of a PSK signal and the equalizer for a PSK signal as described in the above respective embodiments, the impulse response filter 308 can be configured for applicability to coherent optical communication with polarization diversity as including a filter to remove crosstalk to a current symbol in a first polarized due to the other symbols in the first polarization direction and a second filter to remove crosstalk to the current symbol in the first polarized due to symbols in a second polarization direction, where the output of the impulse response filter (i.e., the output of the equalizer) is the sum of an output of the first filter and an output of the second filter, and the equalization coefficient is a vector constituted of coefficients of the first filter and the second filter.

Specifically, in the example illustrated in FIG. 7, the equalizer is a horizontal signal equalizer which receives a signal including both a horizontal input signal $x_h$ (the first polarization direction) and a vertical input signal $x_v$ (the second polarization direction) and which outputs a signal in the horizontal direction $y_h$. Particularly, the first filter is a filter to remove crosstalk to a current signal in the horizontal direction due to the other symbols in the horizontal direction using a first equalization coefficient $W_{hh}$, and the second filter is a filter to remove crosstalk to the current signal in the horizontal direction due to symbols in the vertical direction using a second equalization coefficient $W_{vh}$. For convenient descriptions, the respective filters will be denoted hereinafter directly with the equalization coefficient, e.g., the $W_{hh}$ filter, the $W_{vh}$ filter, etc. It shall be noted that in the descriptions of this embodiment and the sixth embodiment, a subscript related to a point of time t of a symbol will be omitted as necessary for the sake of conciseness.

It is assumed that both the first and second filters be L-tap FIR filters, and then similar to the first embodiment, both $W_{hh}$ and $W_{vh}$ are L-dimension vectors, and the equalization coefficient of the equalizer 308 as a whole (the update target in the step 106 of updating the equalization coefficient and the equalization coefficient updator 306) are a 2L-dimension vector $W_h$ comprised of the elements of $W_{hh}$ and $W_{vh}$. Also inputs to the filters $W_{hh}$ and $W_{vh}$ are L-dimension vectors $X_h$ and $X_v$. The output of the equalizer 308 as a whole, i.e., the inputs to the step 102 of calculating the conjugate product and the conjugate product calculator 302, is the sum of outputs from the two filters $W_{hh}$ and $W_{vh}$, i.e., $y_h = W_{hh}^T X_h + W_{vh}^T X_V$ ($T$ denotes transposition).

Thus for the respective equations in the above respective embodiments, it will be enough to replace the corresponding variables, and specific calculations will readily occur to those skilled in the art in light of the disclosure of this application and general mathematic knowledge, so repeated descriptions thereof will be omitted here.

The same can apply similarly to an equalizer in the vertical direction except for simply replacing the subscripts h and v with each other in FIG. 7 and the relevant equations.

Also the phase difference $\exp(j\Delta\theta)$ due to the frequency difference and a frequency difference estimator 604 are denoted in dotted lines in FIG. 7, which means that as described in the above respective embodiments, the phase difference due to the frequency difference may be present or absent in the system, and upon presence of the phase difference, an estimated result of the phase difference result from the frequency difference estimator 604 in a receiver can be used, or the frequency difference (and hence the phase difference) can be obtained in other ways.

The Sixth Embodiment

The invention further provides a coherent optical receiver including at least one equalizer as described in the above respective embodiments.

Figure 8:
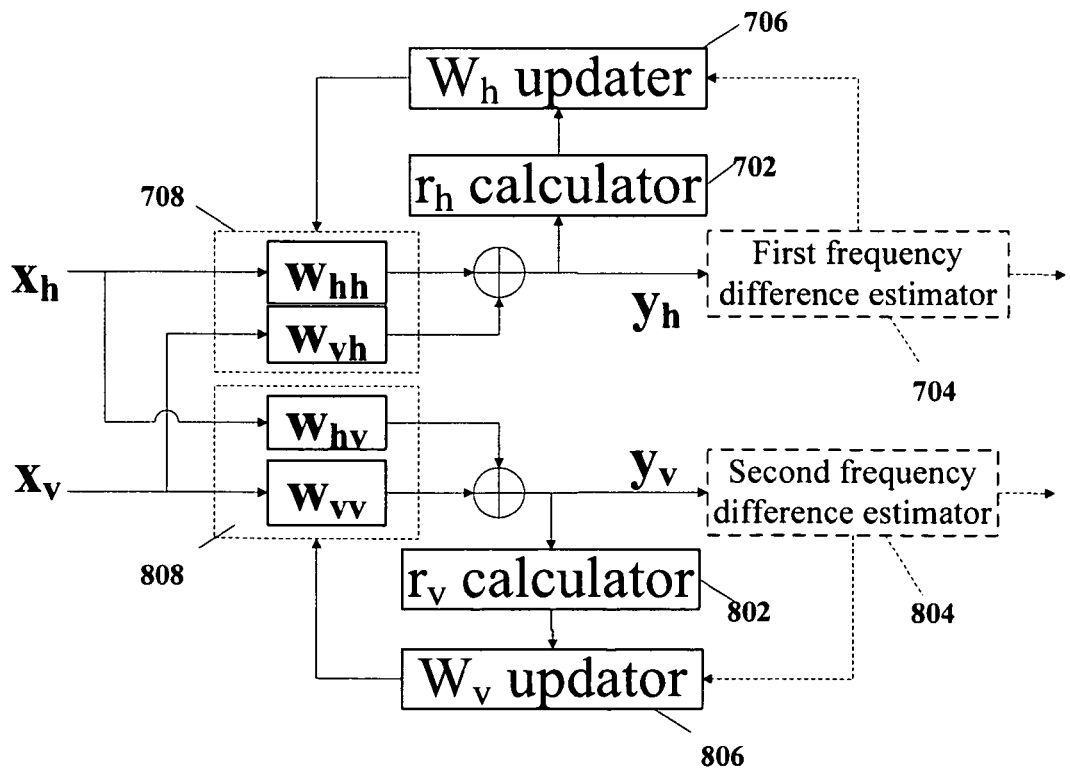
FIG. 8 is a schematic block diagram of a receiver according to a further embodiment of the invention.

In the event of polarization multiplexing, the equalizer as described in the above respective embodiments, especially that as described in the fifth embodiment, can be used in each of polarization direction. In the event of using the equalizer as described in the fifth embodiment, a general architecture of the receiver is as illustrated in FIG. 8, which includes completely symmetric upper and lower equalizers as described in the fifth embodiment. Particularly, for example, the first equalizer equalizes a signal in the horizontal polarization direction and includes a horizontal FIR filter 708, a conjugate product $r_h$ calculator 702 and an equalization coefficient $W_h$ updator 706. When necessary, the first equalizer can utilize a frequency difference estimation result of a first frequency difference estimator 704 in the receiver. For example, the second equalizer equalizes a signal in the vertical polarization direction and includes a vertical FIR filter 808, a conjugate product $r_V$ calculator 802 and an equalization coefficient $W_V$ updator 806. When necessary, the vertical equalizer can utilize a frequency difference estimation result of a vertical frequency difference estimator 804 in the receiver Some embodiments of the invention have been detailed above. As can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and in conjunction with their general programming skills, and therefore repeated descriptions thereof will be omitted here.

In the device and method according to the invention, the respective components or steps can be decomposed, combined and/or decomposed and then recombined. These decompositions and/or recombinations shall be regarded as equivalent solutions of the invention.

It shall further be noted that the above series of processing steps can naturally be performed temporally in the sequence as described above but will not be limited thereto, and some of the steps can be performed concurrently or separately from each other.

Moreover, although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

Finally, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element(s) is(are) defined will not preclude presence of an additional identical element(s) in a process, method, article or device comprising the defined element(s)" unless further defined.

Although the embodiments of the invention and their advantages have been detailed in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalences, and various variations, substitutions and alterations can be made without departing from the spirit and scope of the invention as defined in the appended claims.

As can be apparent from the above descriptions, the following solutions are provided according to the embodiments of the invention.

Appendix 1. A method for adaptive blind equalization of a PSK signal, comprising: calculating a conjugate product of a current output and a precedent output of an FIR filter; updating an equalization coefficient using the conjugate product; and filtering an input signal with the FIR filter using the updated equalization coefficient.

Appendix 2. The method for adaptive blind equalization of a PSK signal according to Appendix 1, wherein the updating an equalization coefficient using the conjugate product comprises: obtaining a gradient of the equalization coefficient using the conjugate product; and updating the equalization coefficient using the gradient.

Appendix 3. The method for adaptive blind equalization of a PSK signal according to Appendix 1, wherein the updating an equalization coefficient using the conjugate product comprises: updating the equalization coefficient using a cost function constructed based on the conjugate product.

Appendix 4. The method for adaptive blind equalization of a PSK signal according to Appendix 3, wherein the cost function is:

$$c=E\{|r^m-\gamma|^2\},$$

where $E\{\bullet\}$ denotes expectation, m denotes the number of constellation points of the PSK signal, r denotes the conjugate product, and $\gamma$ denotes a constant.

Appendix 5. The method for adaptive blind equalization of a PSK signal according to Appendix 3, adapted for a BPSK signal, wherein the cost function is:

$$c=E\{||Re(r)|-\gamma|+|Im(r)|\},$$

where $E\{\bullet\}$ denotes expectation, r denotes the conjugate product, $\gamma$ denotes a real constant greater than 0, and $Re(\bullet)$ and $Im(\bullet)$ denote operations for calculating real part and calculating imaginary parts, respectively.

Appendix 6. The method for adaptive blind equalization of a PSK signal according to Appendix 3, wherein the construction of the cost function further takes into consideration a phase difference between the current output and the precedent output introduced by a frequency difference between an emitting laser and a local oscillation laser.

Appendix 7. The method for adaptive blind equalization of a PSK signal according to Appendix 6, wherein the cost function is:

$$c=E\{|r^m-e^{jm\Delta\theta}|^2\},$$

where E{•} denotes expectation, m denotes the number of constellation points of the PSK signal, r denotes the conjugate product, and $\Delta\theta$ denotes the phase difference.

Appendix 8. The method for adaptive blind equalization of a PSK signal according to Appendix 6, adapted for a BPSK signal, wherein the cost function is:

$$c=E\{||Re(r^{-j\Delta\theta})|-\gamma|+|Im(r^{-j\Delta\theta})|\},$$

where E{•} denotes expectation, r denotes the conjugate product, $\Delta\theta$ denotes the phase difference, $\gamma$ denotes a real constant greater than 0, and Re(•) and Im(•) denote operations for calculating real part and calculating imaginary part, respectively.

Appendix 9. The method for adaptive blind equalization of a PSK signal according to Appendix 1, adapted for polarization diversity coherent optical communication, wherein the FIR filter comprises a first filter to remove a crosstalk of other symbols in a first polarization direction with respect to a current symbol in the first polarization direction, and a second filter to remove a crosstalk of symbols in a second polarization direction with respect to the current symbol in the first polarization direction, wherein the output of the FIR filter comprises a sum of an output of the first filter and an output of the second filter, and the equalization coefficient comprises a vector constituted by a coefficient of the first filter and a coefficient of the second filter.

Appendix 10. An equalizer for a PSK signal, comprising: a conjugate product calculator to calculate a conjugate product of a current output and a precedent output of the equalizer; an equalization coefficient updator to update the equalization coefficient using the conjugate product; and a finite impact response filter to filter an input signal using the updated equalization coefficient.

Appendix 11. The equalizer for a PSK signal according to Appendix 10, wherein the coefficient updator comprises a gradient calculator to obtain a gradient of the equalization coefficient using the conjugate product, wherein the equalization coefficient is updated using the gradient.

Appendix 12. The equalizer for a PSK signal according to Appendix 10, wherein the coefficient updator is configured to update the equalization coefficient using a cost function constructed based on the conjugate product.

Appendix 13. The equalizer for a PSK signal according to Appendix 12, wherein the coefficient updator is configured to update the equalization coefficient using the cost function below:

$$c=E\{|r^m-\gamma|^2\},$$

where E{•} denotes expectation, m denotes the number of constellation points of the PSK signal, r denotes the conjugate product, and $\gamma$ denotes a constant.

Appendix 14. The equalizer for a PSK signal according to Appendix 12, adapted for a BPSK signal, wherein the coefficient updator is configured to update the equalization coefficient using the cost function below:

$$c=E\{||Re(r)|-\gamma|+|Im(r)|\},$$

where E{•} denotes expectation, r denotes the conjugate product, $\gamma$ denotes a real constant greater than 0, and Re(•) and Im(•) denote operations for calculating real part and calculating imaginary part, respectively.

Appendix 15. The equalizer for a PSK signal according to Appendix 12, wherein the coefficient updator is configured to update the equalization coefficient using a cost function constructed based on the conjugate product and a phase difference between the current output and the precedent output introduced by the frequency difference between an emitting laser and a local oscillation laser.

Appendix 16. The equalizer for a PSK signal according to Appendix 15, wherein the coefficient updator is configured to update the equalization coefficient using the cost function below:

$$c=E\{|r^m-e^{jm\Delta\theta}|^2\},$$

where E{•} denotes expectation, m denotes the number of constellation points of the PSK signal, r denotes the conjugate product, and $\Delta\theta$ denotes the phase difference.

Appendix 17. The equalizer for a PSK signal according to Appendix 15, adapted for a BPSK signal, wherein the coefficient updator is configured to update the equalization coefficient using the cost function below:

$$c=E\{||Re(re^{-j\Delta\theta})|-\gamma|+|Im(re^{-j\Delta\theta})|\},$$

where E{•} denotes expectation, r denotes the conjugate product, $\Delta\theta$ denotes the phase difference, $\gamma$ denotes a real constant greater than 0, and Re(•) and Im(•) denote operations for calculating real part and calculating imaginary part, respectively.

Appendix 18. The equalizer for a PSK signal according to Appendix 10, adapted for polarization diversity coherent optical communication, wherein the FIR filter comprises: a first filter to remove a crosstalk of other symbols in a first polarization direction with respect to a current symbol in the first polarization direction, and a second filter to remove a crosstalk of symbols in a second polarization direction with respect to the current symbol in the first polarization direction, wherein the output of the FIR filter comprises a sum of an output of the first filter and an output of the second filter, and the equalization coefficient comprises a vector constituted by a coefficient of the first filter and a coefficient of the second filter.

Appendix 19. A coherent optical receiver, comprising at least one equalizer according to one of Appendices 10 to 18.

The invention claimed is:
1. An equalizer for a PSK signal, comprising:
a conjugate product calculator to calculate a conjugate product r of a current output $y_t$ and a precedent output $y_{t-n}$ of the equalizer, wherein $r=y_t y_{t-n}^*$, t denotes a current time, t−n denotes a precedent time, and n≥1;
an equalization coefficient updator to update the equalization coefficient; and
a finite impact response filter to filter an input signal using the updated equalization coefficient,
wherein the coefficient updator is configured to update the equalization coefficient using a cost function c constructed based on the conjugate product r,
wherein the cost function c is:

$$c=E\{|r^m-\gamma|^2\}$$

where E{•} denotes expectation, m denotes the number of constellation points of the PSK signal, r denotes the conjugate product, and $\gamma$ denotes a constant.
2. An equalizer for a PSK signal, comprising:
a conjugate product calculator to calculate a conjugate product r of a current output yt and a precedent output yt−n of the equalizer, wherein r=yt yt−n*, t denotes a current time, t−n denotes a precedent time, and n≥1;
an equalization coefficient updator to update the equalization coefficient; and
a finite impact response filter to filter an input signal using the updated equalization coefficient, wherein the coefficient updator is configured to update the equalization coefficient using a cost function c constructed based on the conjugate product r, wherein the equalizer is adapted for a BPSK signal, and the cost function c is:

$$c = E\{||Re(r)| - \gamma| + |Im(r)|\},$$

where $E\{\bullet\}$ denotes expectation, r denotes the conjugate product, $\gamma$ denotes a real constant greater than 0, and $Re(\bullet)$ and $Im(\bullet)$ denote operations for calculating real part and calculating imaginary part, respectively.

3. An equalizer for a PSK signal, comprising:
a conjugate product calculator to calculate a conjugate product r of a current output yt and a precedent output yt−n of the equalizer, wherein r=yt yt−n*, t denotes a current time, t−n denotes a precedent time, and n≥1;
an equalization coefficient updator to update the equalization coefficient; and
a finite impact response filter to filter an input signal using the updated equalization coefficient,
wherein the coefficient updator is configured to update the equalization coefficient using a cost function c constructed based on the conjugate product r and a phase difference between the current output and the precedent output introduced by the frequency difference between an emitting laser and a local oscillation laser,
wherein the cost function c is:

$$c = E\{|r^m - e^{jm\Delta\theta}|^2\},$$

where $E\{\bullet\}$ denotes expectation, m denotes the number of constellation points of the PSK signal, r denotes the conjugate product, and $\Delta\theta$ denotes the phase difference.

4. An equalizer for a PSK signal, comprising:
a conjugate product calculator to calculate a conjugate product r of a current output yt and a precedent output yt−n of the equalizer, wherein r=yt yt−n*, t denotes a current time, t−n denotes a precedent time, and n≥1;
an equalization coefficient updator to update the equalization coefficient; and
a finite impact response filter to filter an input signal using the updated equalization coefficient,
wherein the coefficient updator is configured to update the equalization coefficient using a cost function c constructed based on the conjugate product r and a phase difference between the current output and the precedent output introduced by the frequency difference between an emitting laser and a local oscillation laser,
wherein the equalizer is adapted for a BPSK signal, and the cost function c is:

$$c = E\{||Re(re^{-j\Delta\theta})| - \gamma| + |Im(re^{-j\Delta\theta})|\},$$

where $E\{\bullet\}$ denotes expectation, r denotes the conjugate product, $\Delta\theta$ denotes the phase difference, $\gamma$ denotes a real constant greater than 0, and $Re(\bullet)$ and $Im(\bullet)$ denote operations for calculating real part and calculating imaginary part, respectively.

* * * * *